Jan. 26, 1960   J. F. BIGELOW   2,922,954
CIRCUIT TESTER
Filed Nov. 19, 1958
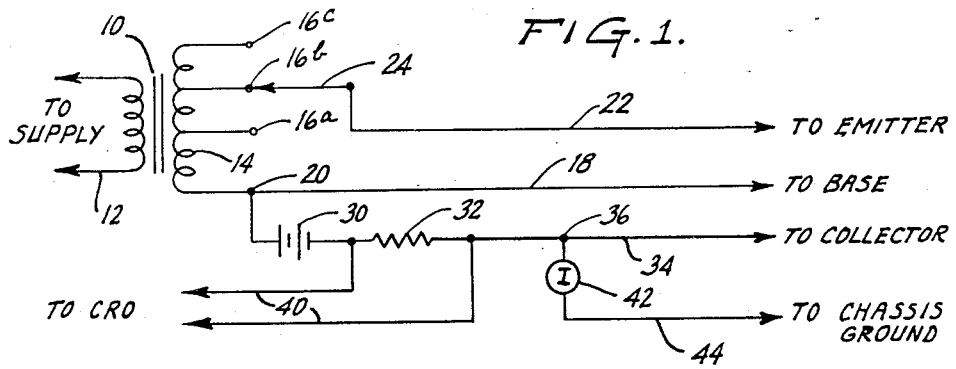
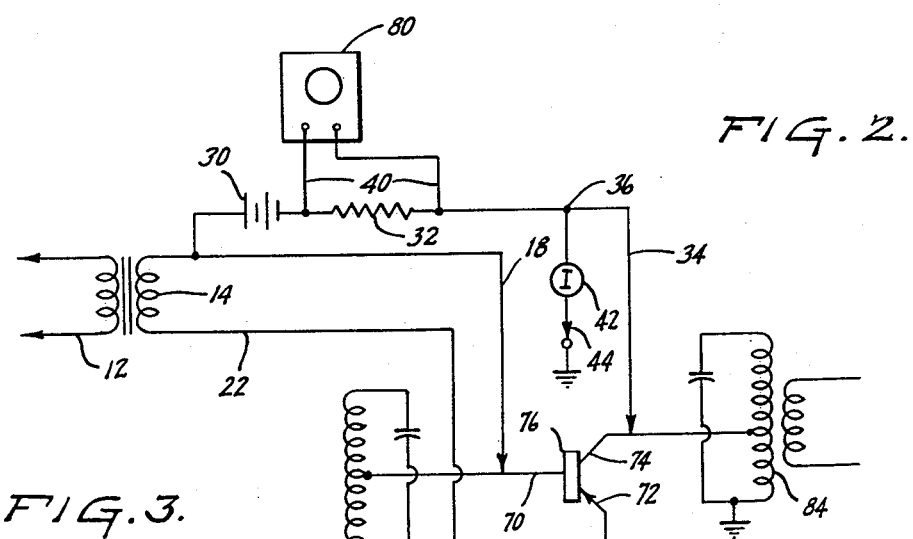
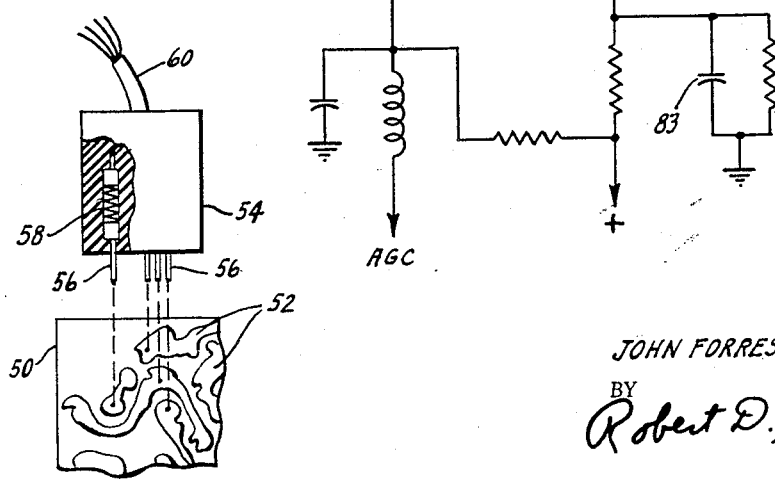
INVENTOR.
JOHN FORREST BIGELOW
BY
Robert D. Sanborn
ATTORNEY

United States Patent Office 2,922,954
Patented Jan. 26, 1960

2,922,954

CIRCUIT TESTER

John F. Bigelow, Erdenheim, Pa., assignor to Philco Corporation, Philadelphia, Pa., a corporation of Pennsylvania Application November 19, 1958, Serial No. 774,966

11 Claims. (Cl. 324—158)

The present invention relates to testing circuits and more particularly to means for testing transistors while connected in amplifier circuits or the like.

For reasons which do not require elaboration here it is common practice to solder transistors directly to printed wiring boards or the like. This practice has the disadvantage that if the circuit is faulty in some respect it is often difficult to determine with conventional testing means whether the fault lies in the transistor or in some other element of the circuit. Experience has shown that it is impractical to attempt to unsolder the transistors from the printed wiring board to test them. The heat conducted to the transistor element by way of the leads during the unsoldering and resoldering operation frequently destroys the transistor even though it may have been fault-free before it was unsoldered from the circuit. As a result, servicing and repair of printed wiring boards and other circuit assemblies employing soldered-in transistors is difficult, time consuming, and expensive and usually results in the destruction of many fault-free elements.

Therefore it is an object of the present invention to provide a simple and inexpensive circuit for the in-circuit testing of transistors.

It is a further object of the present invention to provide a novel circuit for the in-circuit testing of transistors which provides indications of circuit faults which are different from the indications representing transistor faults.

Still another object of the invention is to provide a circuit for the in-circuit testing of transistors which is capable of providing different indications representing respectively different faults in the transistors under test.

These and other objects of the present invention which will become apparent as the description of the invention proceeds are accomplished by providing a test circuit which includes a source of alternating current signal having a source impedance which is low compared to the normal circuit impedance between base and emitter in the circuit to be tested. The test circuit further includes a series circuit connected to one terminal of said source. This series circuit includes a bias source for biasing the transistor under test and a load impedance across which is developed a signal indicative of the condition of the transistor under test. The impedance of this series circuit is preferably made low compared to the normal circuit impedance between the base and the collector of the transistor under test. In certain preferred embodiments of the invention the test circuit may also include a meter circuit connected between one terminal of the load circuit circuit and ground. Means such as spring loaded contact fingers are provided for making detachable electrical contact between the various terminals of the test circuit and the circuit to be tested.

For a better understanding of the present invention together with other and further objects thereof, reference should now be made to the following detailed description which is to be read in conjunction with the accompanying drawings in which:

Fig. 1 is a schematic diagram of the test circuit of the present invention;

Fig. 2 is a schematic diagram showing the test circuit of Fig. 1 connected to a typical IF amplifier stage including a transistor; and Fig. 3 is a view, partially in section, showing a unitary plug for making contact with several selected points on a printed wiring board.

Turning now to the preferred embodiment of the invention shown in Fig. 1, the source of the test signal in this embodiment is a transformer 10 which includes a primary winding 12 which may be connected to a source of alternating current signal such as an oscillator or an alternating current supply line. The transformer 10 further includes a secondary winding 14 which is provided with a series of taps 16$^a$–16$^c$ each supplying an alternating current signal at a different amplitude level. It has been found in practice that an amplitude of the order of 0.01 volt is sufficient for the testing of power transistors and an amplitude of the order of 0.02 volt is satisfactory for testing surface barrier transistors. A lead 18 is provided for connecting end terminal 20 of secondary winding 14 to a point in the circuit under test which is conductively connected to the base of the transistor to be tested. A second lead 22 is connected to movable tap 24 which makes contact with a selected one of taps 16$^a$–16$^c$. Conductor 22 provides means for making electrical contact between the test circuit and a point in the circuit to be tested which is electrically connected substantially directly to the emitter.

A series load circuit comprising a bias source 30 and a load resistor 32 has one terminal connected to terminal 20 of secondary winding 14. Bias source 30 provides a base-to-collector bias for the transistor to be tested. This bias may be of the order of 3 volts in a typical circuit. The impedance of this series circuit should be relatively low compared to the normal circuit impedance connected between the base and collector of the transistor in the circuit under test. It has been found in practice that a resistance of the order of 100 ohms is satisfactory. A third conductor 34 is provided for making electrical connection between the emitter of the transistor under test and the free end 36 of the series circuit. Means such as a pair of leads 40 may be provided for connecting the end terminals of resistor 32 to the input terminals of a waveform indicator such as a cathode-ray oscilloscope. A meter 42, which may have a full scale reading of one milliampere, has one terminal connected to the end terminal 36 of the series circuit. A lead 44 is provided for connecting the other terminal of meter 42 to the negative terminal of the supply source for the circuit under test. If the circuit under test has a supply source, the negative terminal of which is grounded, lead 44 may be connected to any convenient point on the common ground bus.

Any convenient means such as test probes, alligator clips or the like may be provided on leads 18, 22, 34 and 44 for connecting these leads to the appropriate points in the circuit. For the production testing of printed wiring boards using the circuit of Fig. 1 it may be desirable to terminate all four leads 18, 22, 34 and 44 in a unitary plug having spring loaded contacts which are positioned on the plug so as to make contact with appropriate points on the printed wiring.

Fig. 3 shows a typical wiring board 50 having conductive areas 52 formed thereon. Plug 54 is provided with spring loaded contact pins 56 which engage the conductive areas 52 on the printed wiring board 50. A portion of plug 54 has been broken away to show the spring 58 which is provided for yieldably urging one of the pins 56 against the corresponding conductive area on the printed wiring board 50. The other contact pins 56 may be provided with similar springs 58. The contact pins 56 connect to corresponding conductors in multi-conductor cable 60. Means (not shown) may be provided for controlling the lateral position of plug 54 relative to board 50 and for moving plug 54 into engagement with board 50.

Fig. 2 shows the test circuit of Fig. 1 connected to a typical intermediate frequency amplifier stage. As shown in Fig. 2, leads 18, 22 and 34 are connected to the base 70, the emitter 72 and the collector 74 of a transistor 76. Lead 44 is connected to ground. All three terminals of the transistor are isolated from ground by impedance elements in the circuit under test. The circuit shown will not be described further since it plays no part in the operation of the present invention. A cathode-ray oscilloscope 80 is shown connected to leads 40 to complete the test set-up.

The test circuit of Figs. 1 and 2 operates in the following manner. The normal power supply source for the circuit under test is removed or disconnected. The alternating current signal supplied by secondary winding 14 is impressed between base 70 and emitter 72 of transistor 76. Bias source 30 biases transistor 76 to the desired operating point on its characteristic curve. It will be seen that the test circuit together with the transistor forms a common base amplifier circuit which operates class B. Because of the low impedance of the source represented by secondary winding 14 and the low impedance of the load as represented by resistor 32, this amplifier circuit operates substantially independently of the circuit elements normally associated with transistor 76 in the circuit under test. When the emitter is made positive with respect to the base by the signals supplied by secondary winding 14, collector current will flow through resistor 32. When the emitter is made negative with respect to the base as a result of the signal supplied by secondary winding 14, the transistor will be cut off and no collector current will flow through resistor 32. Therefore, a good transistor will show a series of half sine waves on the oscilloscope 80 connected across resistor 32. The amplitude of these half sine waves will depend upon the transconductance of the transistor 76. Meter 42 will have a low reading owing to the relatively high impedance path from the positive terminal of bias source 30 to ground through the elements of the circuit under test.

Faults in transistor 76 may be identified in the following manner. A transistor with low transconductance will cause the amplitude of the half sine waves appearing across resistor 32 to be of relatively small amplitude.

If there is an emitter-to-collector short circuit in transistor 76, the signal appearing across resistor 32 will be full sine waves since lead 22 will be connected directly to lead 34 through this short circuit. However meter 42 will have a low reading as before.

If there is an emitter-to-ground short circuit in the circuit under test, such as might occur if the bypass capacitor 83 becomes short circuited, full sine waves will again appear across resistor 32 owing to the relatively low impedance between collector 74 and ground which permits signal current to flow by way of lead 22 through the short circuit to ground and then by way of inductor 84 and lead 34 to resistor 32. An emitter-to-ground short circuit may be distinguished from an emitter-to-collector short circuit since, for an emitter-to-ground short circuit, meter 42 will have a relatively high reading owing to the direct current flowing through resistor 32, meter 42 to ground and from there through the emitter-to-ground-short circuit to lead 22 and back through secondary winding 14 to the other side of bias source 30. Meter 42 is shunted by the portion of inductor 84 which is between the collector 74 and ground. Therefore meter 42 should be selected to have a sensitivity such that the desired scale reading is obtained in the presence of this shunt.

The invention has been described with specific reference to three element transistors having only base, emitter and collector. However, it is obvious that the invention is equally applicable to transistors having more than three elements. Additional leads and additional bias sources or signal sources may be provided for supplying the additional element or elements with the appropriate bias potentials and/or energizing signals.

While the invention has been described with reference to the preferred embodiment thereof, it will be apparent that various modifications and other embodiments thereof will occur to those skilled in the art within the scope of the invention. Accordingly I desire the scope of my invention to be limited only by the appended claims.

What is claimed is:

1. A circuit for testing for faults in a transistor circuit in which the base and emitter of the transistor in the circuit to be tested are electrically isolated from ground, said testing circuit comprising a source of alternating current signal, said source having first and second output terminals, means for connecting said first and second output terminals, respectively, to points in said transistor circuit to be tested which are conductively connected to said base and said emitter, respectively, the impedance of said source being less than the normal circuit impedance between said base and said emitter, a source of bias potential and an impedance connected in series combination, the impedance of said series combination being less than the normal circuit impedance between said collector and said base, a first end terminal of said series combination being connected to said first terminal of said source of alternating current signal, means for connecting the second end terminal of said series combination to a point in said circuit to be tested which is conductively connected to the collector of said transistor, said impedance in said series circuit providing a direct current path therethrough, said impedance in said series circuit being provided with first and second conductive regions to which a signal waveform detector may be connected.

2. A testing circuit, as recited in claim 1, said testing circuit further comprising a direct current meter, one terminal of said meter being connected to said second end terminal of said series combination, means associated with the other terminal of said meter for connecting said other terminal to a selected point in said circuit to be tested.

3. A circuit for testing for faults in a transistor circuit which includes a transistor having base, collector and emitter electrodes, at least two of said transistor electrodes being normally ungrounded, and separate impedance means connected between ground and said base, said collector and said emitter electrodes, respectively, said testing circuit comprising a source of alternating current signal having first and second output terminals, means for connecting said first and second output terminals to points in said circuit to be tested which are conductively connected directly to said base electrode and said emitter electrode, respectively, the driving impedance of said source being substantially less than the normal impedance between said base electrode and said emitter electrode at the frequency of said source, a source of constant bias potential and an impedance connected in series circuit, means for connecting a first end terminal of said series circuit to a point in said circuit under test which is conductively connected to said base electrode, means for connecting the second end terminal of said series circuit to a point in said circuit under test which is conductively connected to the collector electrode of said transistor, said impedance in said series circuit providing a direct current path therethrough, the impedance of said series circuit being small compared to the normal circuit impedance in said circuit under test between said base electrode and said collector electrode, and means for providing an indication of the waveform of the signal appearing across said impedance in said series circuit.

4. A testing circuit as in claim 3, said testing circuit further comprising a direct current meter, one terminal of said meter being connected to said second end terminal of said series circuit, and means associated with the other terminal of said meter for connecting said other terminal to a selected point of reference potential in said circuit to be tested.

5. A circuit for testing for faults in a transistor circuit which includes a transistor having base, emitter and collector electrodes, at least two of said transistor electrodes being normally ungrounded, and separate impedance means connected between ground and said base, said collector and said emitter electrodes respectively, said testing circuit comprising a source of alternating current signal having first and second output terminals, means for connecting said first and second output terminals to points in said circuit to be tested which are conductively connected directly to said base electrode and said emitter electrode, respectively, the impedance of said source being small compared to the normal impedance in said transistor circuit between said base electrode and said emitter electrode at the frequency of the signal supplied by said source, a source of bias potential and a resistance connected in series circuit, a first end terminal of said series circuit being connected to said first terminal of said source of alternating current signal, means for connecting the second end terminal of said series circuit to a point in said transistor circuit which is conductively connected to the collector electrode of said transistor, said resistor having an impedance small compared to the normal impedance in said circuit to be tested between said base electrode and said collector electrode, and an oscilloscope having signal input terminals thereof connected across said resistor for measuring the waveform of the signal appearing thereacross.

6. A testing circuit as in claim 5 wherein said source comprises a transformer having a primary winding and a secondary winding, said first and second terminals of said source corresponding respectively to first and second terminals on said secondary winding.

7. A testing circuit in accordance with claim 6 wherein said testing circuit further comprises a direct current meter, one terminal of said meter being connected to said second end terminal of said series circuit and means for connecting said other terminal of said meter to a ground point in said circuit to be tested.

8. In combination with an oscilloscope, a circuit for testing for faults in a transistor circuit which includes a transistor having base, collector and emitter electrodes, at least two of said transistor electrodes being ungrounded, and separate impedance means connected between ground and said base electrode, said collector electrode and said emitter electrode, respectively, said testing circuit comprising a transformer having a primary winding and a secondary winding, resilient contact means connected to first and second terminals of said secondary winding and adapted to make resilient, detachable, ohmic contact with points in said transistor circuit which are conductively connected directly to said base electrode and said emitter electrode respectively, a source of bias potential and a resistive impedance connected in series circuit, a first end terminal of said series circuit being connected to said first terminal of said secondary winding, resilient contact means connected to the second end terminal of said series circuit and adapted to make detachable, ohmic contact to a point in said transistor circuit which is conductively connected to the collector electrode of said transistor, the impedance of said series circuit being small compared to the normal circuit impedance between said base electrode and said collector electrode at the frequency of the signal supplied to said primary winding, means for coupling the signal input terminals of said oscilloscope to two separate points on the resistive impedance in said series circuit, a direct current meter, one terminal of said meter being connected to said second end terminal of said series circuit, and means associated with said other terminal of said meter for detachably connecting said other terminal to a point of reference potential in said circuit to be tested.

9. A transistor circuit tester comprising a source of alternating current signal, said source having first and second output terminals, means for connecting said first and second output terminals, respectively, to points in said transistor circuit to be tested which are conductively connected to the base electrode and the emitter electrode, respectively, of a transistor in said transistor circuit to be tested, the impedance of said source being less than the normal circuit impedance between said points of connection of said first and second output terminals, a source of bias potential and an impedance connected in series combination, a first end terminal of said series combination being connected to one of said terminals of said source of alternating current signal, means for connecting the second end terminal of said series combination to a point in said transistor circuit to be tested which is conductively connected to the collector electrode of said transistor, the impedance of said series combination being less than the normal circuit impedance between said collector electrode and the point on said circuit to be tested to which said first end terminal of said series combination is connected, said impedance in said series circuit providing a direct current path therethrough, and means for connecting a signal indicator device in shunt with said impedance in said series circuit.

10. A transistor circuit tester comprising a source of alternating current signal having first and second output terminals, means for connecting said first and second output terminals to points in said circuit to be tested which are conductively connected directly to the base and emitter electrodes, respectively, of a transistor in the circuit to be tested, the driving impedance of said source being substantially less than the normal circuit impedance between said base electrode and said emitter at the frequency of said source, a source of bias potential and an impedance connected in series circuit, means for conductivity connecting a first end terminal of said series circuit to a point in said circuit under test which is conductively connected to said emitter electrode, the impedance of said series combination being less than the normal circuit impedance between said collector electrode and the point in said circuit to be tested to which said first end terminal of said series circuit is connected, means for connecting the second end terminal of said series circuit to a point in said circuit under test which is conductively connected to the collector electrode of said transistor, said impedance in said series circuit providing a direct current path therethrough, and a signal indicator connected in shunt with said impedance for indicating a characteristic of the potential appearing across said impedance.

11. A transistor circuit tester comprising a source of alternating current signals having first and second output terminals, means for connecting said first and second output terminals to points in said circuit to be tested which are conductively connected to base and emitter electrodes, respectively, of a transistor in the transistor circuit to be tested, the driving impedance of said source being substantially less than the normal impedance between said base electrode and said emitter electrode at the frequency of the signal supplied by said source, a source of bias potential and an impedance connected in series circuit, means for connecting a first end terminal of said series circuit to a point in said circuit under test which is conductively connected to said emitter electrode, means for connecting the second end terminal of said series circuit to a point in said circuit under test which is conductively connected to the collector electrode of said transistor, said impedance in said series circuit providing a direct current path therethrough, the impedance of said series circuit being small compared to the normal circuit impedance in said circuit under test between said emitter electrode and said collector electrode, and means for providing an indication of a selected characteristic of the signal appearing across said impedance in said series circuit.

No references cited.